(12) United States Patent
Long et al.

(10) Patent No.: US 6,517,335 B1
(45) Date of Patent: Feb. 11, 2003

(54) APPARATUS DEWATERING AN ELASTOMERIC POLYMER

(75) Inventors: Robert L. Long, Houston, TX (US); Richard C. Yeh, Bellaire, TX (US); Bruce Charles Devoy, Baton Rouge, LA (US)

(73) Assignee: Exxon Chemical Patents Inc., Houston, TX (US)

( * ) Notice: Subject to any disclaimer, the term of this patent is extended or adjusted under 35 U.S.C. 154(b) by 0 days.

(21) Appl. No.: 09/347,206

(22) Filed: Jul. 2, 1999

Related U.S. Application Data

(60) Provisional application No. 60/091,766, filed on Jul. 6, 1998.

(51) Int. Cl.[7] ............................................. B29C 47/92
(52) U.S. Cl. ........................ 425/135; 425/144; 425/145; 425/376.1; 425/461
(58) Field of Search ................................. 425/135, 144, 425/145, 381, 465, 466, 376.1, 461

(56) References Cited

U.S. PATENT DOCUMENTS

| | | | | |
|---|---|---|---|---|
| 4,721,448 A | * | 1/1988 | Irish et al. ................... | 425/144 |
| 4,885,709 A | * | 12/1989 | Edgar et al. ............. | 250/358.1 |
| 5,041,249 A | | 8/1991 | Yeh ............................... | 264/85 |
| 5,650,107 A | | 7/1997 | Vetter et al. ................. | 264/102 |
| 5,714,187 A | | 2/1998 | Froidevaux et al. ....... | 264/40.1 |
| 5,754,722 A | * | 5/1998 | Melling ....................... | 250/576 |
| 5,901,261 A | * | 5/1999 | Wach .......................... | 385/116 |

FOREIGN PATENT DOCUMENTS

| | | |
|---|---|---|
| DE | 4441350 C | 6/1996 |
| JP | S59-188082 | 10/1984 |
| WO | WO 98/13412 | 4/1998 |
| WO | WO 98/29787 | 7/1998 |

OTHER PUBLICATIONS

"Impact Fracture Toughness of Propylene / 1–Pentene Random Copolymers" Tincul, et al., Polymer Material Sci. Eng., PMSEDG 79, p. 190–191, 1998.

* cited by examiner

*Primary Examiner*—Jan H. Silbaugh
*Assistant Examiner*—Joseph Leyson

(57) ABSTRACT

An apparatus for dewatering a slurry of elastomeric polymer and water, using an extruder or extruders provided with a device for measuring an actual water content of the elastomer at a position within the extruder or extruders, and a control system for controlling the moisture content of elastomeric polymer exiting the extruder or extruders through an exit die based, at least in part, on the measured water content.

5 Claims, 2 Drawing Sheets

APPARATUS DEWATERING AN ELASTOMERIC POLYMER

RELATED APPLICATIONS

This application claims priority from an earlier filed application Ser. No. 60/091,766, filed Jul. 6, 1998.

FIELD OF THE INVENTION

This invention relates to an apparatus and method for dewatering an elastomeric polymer. More specifically, the invention is directed to an apparatus and method for dewatering a slurry of water and/or other liquids and elastomeric polymer, (e.g., ethylene propylene diene monomer rubber (EPDM), ethylenepropylene rubber (EPR), butyl rubber, halogenated butyl rubber and the like) in which the slurry is extruded through the barrel of a dewatering extruder, while the extruder conditions are continuously adjusted to provide a predetermined moisture content to the dewatered extrudate based on a real-time measurement of the water or moisture content of the elastomeric polymer within the extruder barrel. By controlling the moisture content of the elastomeric polymer based on the water or moisture content within the extruder barrel, a more efficient process can be achieved, and thus, a superior finished elastomeric polymer product, can be provided.

BACKGROUND OF THE INVENTION

In the production of elastomeric polymers (or "elastomers"), water is conventionally used to convey and cool the elastomers after the end of polymerization, as well as to remove excess monomer from the elastomer. A portion of this process water must then be separated or removed from the elastomeric polymer prior to packaging and shipping, separation of the water from the elastomeric polymer is commonly accomplished using an extruder based dewatering and drying process. the elastomeric polymer is commonly accomplished using an extruder based dewatering and drying process.

In separating the water from the elastomeric polymer to form a dewatered or dried product, (referred to as "bale" or "crumb") the advantages of precisely controlling the moisture content of the crumb within the extrusion process are well recognized. Knowing the water content precisely within the extruder or extruders themselves, provides control guidelines or drying temperature requirements, extruder operating capacity, crumb quality (such as porosity, fines, and crumb size distribution). These in turn, control the bale quality such as the residual moisture and friability in the finished product. Friability is important for semi-crystalline elastomeric polymers. A friable bale leads to good dispersion of elastomer in the mixing process such as a Banbury mixer.

Prior attempts to control the moisture content of the elastomer crumb extruded through a dewatering extruder have proven inadequate. One such method involved manually taking a sample of the elastomer/water mixture then subsequent analysis of the withdrawn sample outside the extruder. Japanese Patent Application 59-188082 to Tokuyama Soda Co., Ltd. describes one such process in which the withdrawn sample is formed into a thin sheet and scanned with an infra-red (IR) scanner. Another method involves the analysis of samples collected at the exit port of the dewatering extruder. Such methods are generally not capable of providing sufficiently accurate water content analysis, as the true water content is obscured by the instantaneous release of water that occurs upon exit of the elastomer from the extruder at an elevated temperature and elevated (above atmospheric) pressure. More importantly, such methods can only provide moisture analysis on an in-frequent basis, such as hourly, which in turn further delays any control mechanism.

Therefore, it would be highly desirable to provide a method and apparatus for better controlling the moisture content of an elastomer product that is recovered from an elastomer/water mixture by use of a dewatering extruder process. The present inventors have found that precise and effective control of the moisture content of an elastomer product can be achieved by continuously measuring and instantaneously analyzing the water content of the elastomeric polymer at a point within a dewatering extruder and or a drying extruder and adjusting extruder conditions using a closed loop moisture control system based, at least in part, on the measured water content.

SUMMARY OF THE INVENTION

More precise control of elastomeric polymer product moisture content can be achieved by measuring and analyzing the water content of an elastomer/water content at a position within the barrel of a dewatering or drying extruder or both, instantaneously comparing the measured water content of the elastomer/water mixture to a reference value that correlates to a predetermined product moisture content and adjusting extruder conditions (e.g., adjusting the extruder exit die aperture, extruder temperature, initial slurry water content combinations thereof and the like) when the measured elastomer water content differs from the reference or desired value. Due to the fact that the slurry being dewatered is opaque, conventional "transmission type" probes are not acceptable. Instead, a diffuse reflectance type probe, which does not rely on passing a light beam through the material being analyzed, is used.

A method and apparatus is presented for determining the water content of a water/elastomer mixture within the barrel of a dewatering or drying extruder, and using the measured water content to adjust extruder conditions to provide a desired elastomer product moisture content. In a preferred embodiment, the method and apparatus of the invention relates to controlling the moisture content of the elastomer product by determining the water content of the elastomer using a Fourier Transform Near Infrared (FTNIR) spectrometer coupled to a high pressure, diffuse reflectance probe, provided within the barrel of the dewatering or drying extruder.

Other and further objects, advantages and features of the present invention will be understood by reference to the following specification and appended claims.

Variations of such process, are also contemplated such as more or less extruders used either in parallel or in series.

Figure 2:
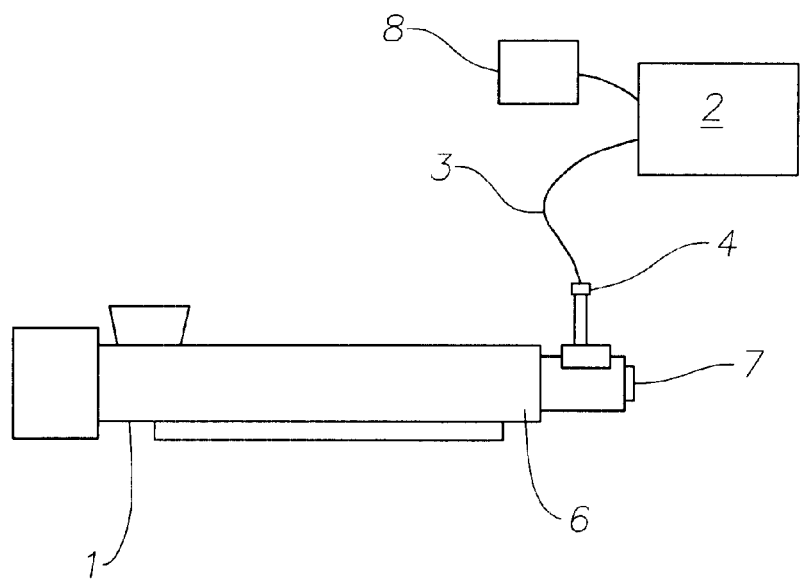

FIG. 2 is a diagrammatic representation of a dewatering extruder, illustrating the placement of the FTNIR probe for a determination of water content measured within the extruder barrel in accordance with the present invention.

Figure 3:
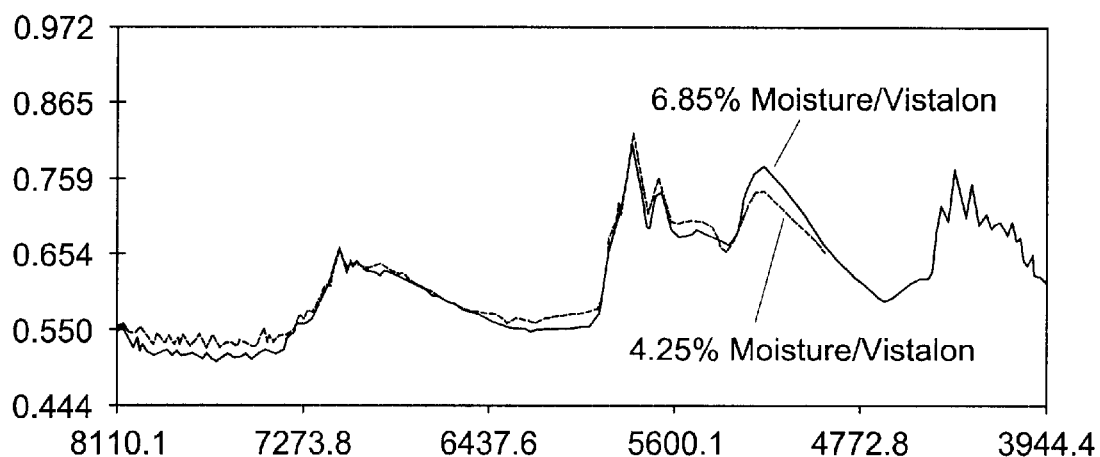

FIG. 3 shows FTNIR spectra of an ethylene-propylene diene monomer rubber, or EPDM (Vistalon™, a product of Exxon Chemical Company), at 4.25% and 6.85% water contents.

Figure 4:
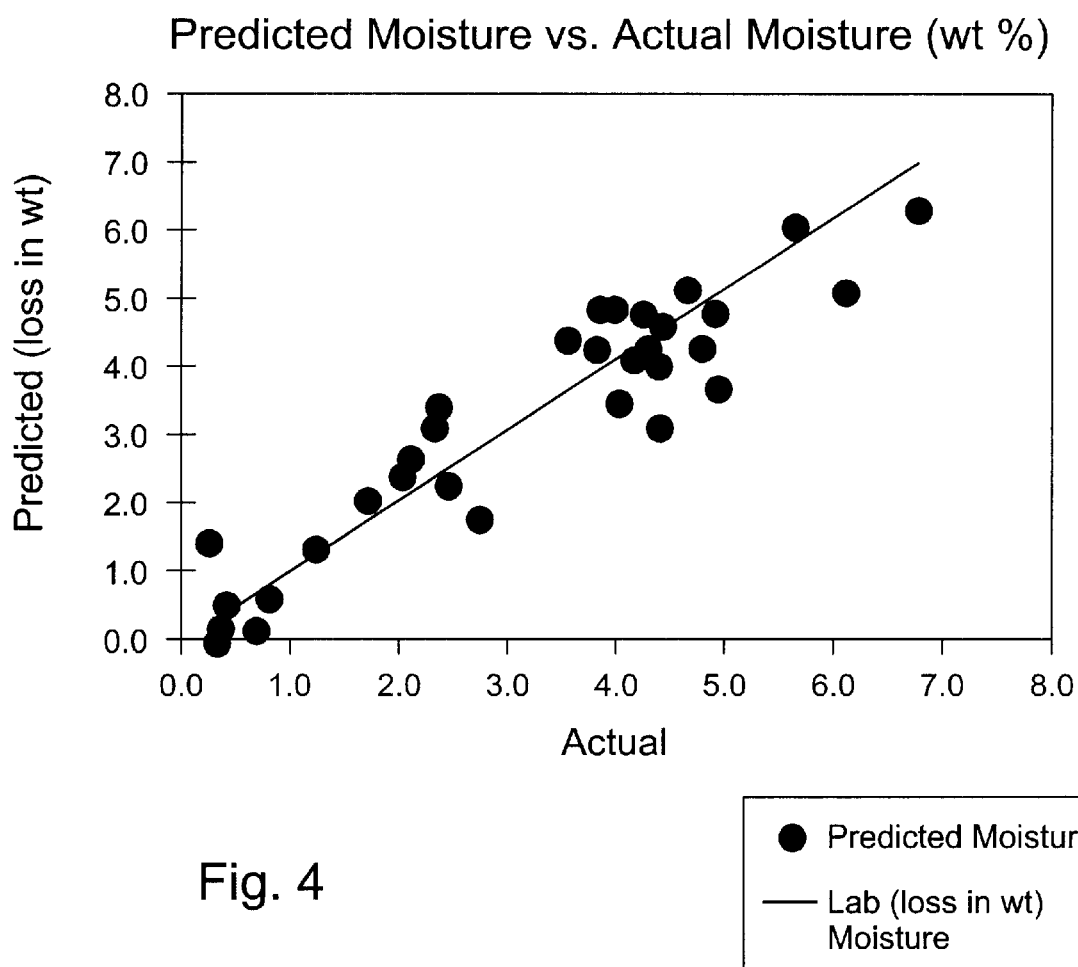

FIG. 4 shows a comparison of water content predicted from in situ FTNIR spectral measurement and actual water content.

DETAILED DESCRIPTION

Figure 1:
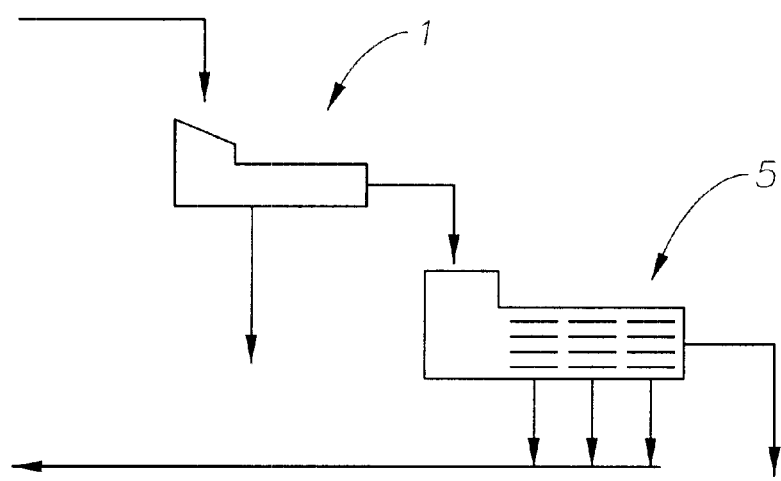
FIG. 1 is a diagrammatic representation of a conventional extruder dewatering and drying process for recovering product elastomer from a water/elastomer slurry.

Extrusion dewatering and drying processes, as shown in FIG. 1, generally operate using multiple stages; a first dewatering stage, and a subsequent drying stage. Many extruders can be used for this process. For example, an Expeller, manufactured by V. D. Anderson, or by French Oil Mill Machinery is used as a dewatering extruder, where as the elastomeric slurry is compressed by the screw within the barrel, and the water is drained through the slots along the barrel, and evaporated at the exit die. Other dewatering extruders, such as Slurry Dewatering Unit (SDU), Dewatering Extruder (DWE) manufactured by Welding Engineers, Inc., can perform similar functions. The dewatered elastomeric crumb, coming out of such dewatering extruders, may then be fed to another drying extruder whereas, through mechanical shear by the screw of such drying extruder, and heating from the extruder jacket the elastomer crumb with water is further heated and compressed and then extruded through the die. Drying is achieved when substantially all water is removed by flashing outside the die with sufficient temperature generated inside the drying extruder. By knowing the water content inside the drying extruder, the temperature requirement to achieve drying (or a specific low moisture level) can then be precisely controlled. Insufficient heating will result in inadequate drying. Excessive heating will result in product degradation, excessive flushing at the die, producing fines. Therefore, by measuring and controlling the water content precisely and continuously will generally avoid insufficient drying or excessive drying.

Examples of typical drying extruders include the Expander, manufactured by V. D. Anderson, and French Oil Mill Machinery, the Volatile Control Unit (VCU) and the Dual Worm Dryer (DWD) manufactured by Welding Engineers, Inc. Other elastomer dewatering and drying extruders are also available from Japan Steel Works, and others. Many variations of above extruders can be assembled in series or in parallel or manufactured into one single extruder with dewatering, drying and venting sections.

Generally, the overriding difficulty in the control of the dewatering extruder involves the control of dewatering extruder (1). Variations in the water content of the water/elastomer mixture (or slurry) fed to the dewatering extruder (1), the slurry feed rate, and slurry chemistry can disrupt the dewatering extruder's stability. This, in turn, upsets the moisture content and quality of the elastomer crumb exiting dewatering extruder (1), which destabilizes the operation of the drying extruder (5) and adversely affects other downstream processing equipment. Upsets in extrusion lead to drying problems, poor friability control, poor friability leads to poor control of dispersion of the finished elastomer during end use mixing procedures, and potential plugging of equipment. By precisely controlling the moisture content of the elastomer crumb exiting the dewatering extruder (also referred to as outlet moisture-in-crumb quantity or mill moisture), these problems can be generally avoided.

Use of the term elastomer as used herein will also be descriptive of all elastomeric polymers and plastics, and includes ethylene-propylene-diene monomer rubber (EPDM), ethylene propylene rubber (EPR), butyl rubber, halobutyl rubber, styrene-isoprene-styrene (SIS), styrene-butadiene copolymers (SBC), poly-isoprene rubber, poly-isobutylene rubber (PIB), styrene-butadienestyrene (SBS), styrene-butadiene rubber (SBR), poly-butadiene rubber (BR), blends of said elastomeric polymers as well as blends of these rubbers with thermoplastics.

"By moisture or water we intend any combination of water, water vapor, and/or other process solvents and combinations thereof." References to water and moisture include such mixtures.

In accordance with the present invention, the mill moisture is precisely controlled based on measurement of the water content of the elastomer slurry. The invention includes any device suitable for measuring the water content of the elastomer slurry. A preferred device uses near infrared spectroscopy to measure the water content, such as, but not limited to, Fourier Transform Near Infrared (FTNIR) and dispersive near infrared spectroscopy. In a preferred embodiment, the water content of the elastomer slurry within the barrel portion of the dewatering extruder using FTNIR spectroscopy. The FTNIR water content analysis is based on a prediction of water content predicated on mathematical models relating known mill moisture values (determined in a laboratory) to infrared spectra acquired by FTNIR spectroscopy. Each infrared spectra (see FIG. 3) includes an array of frequency to absorbance values (approximately 2000). Each individual known (or "off-line") mill moisture is correlated in time with an individual infrared spectra recorded by the spectrometer analyzer (e.g., an Analect (Ivine, Calif.) Diamond 20 FTNIR). To build the mathematical model, an array of known off-line mill moisture and infrared spectra is constructed. This array of variables is the reduced to principle component "scores" by principal components analysis (PCA). The principle component scores are then regressed against known moisture values using principle component regression (PCR) to produce a moisture prediction model that can be executed by a software package of the spectrometer analyzer.

The initial model can be further improved with off-line spectra data for various elastomer grades, or can be upgraded after actual use with data generated on different elastomer grades in the drying extruder ("on-line" data) by laboratory analysis of the dewatering extruder mill moisture contents and spectra. As more on-line data becomes available, the on-line data can be used to replace the original "off-line" data in the mathematical model. Eventual replacement of the off-line data with on-line data, including data on various elastomer grades, results in a highly accurate moisture prediction, as is apparent by the comparison of actual moisture contents to predicted moisture contents shown in FIG. 4.

As best shown in FIG. 2, the FTNIR spectrometer analyzer 2, which, in turn, is coupled via fiber optic link 3 (e.g., spectroscopy grade silica fiber optic cable) to probe 4. Because the slurry within the extruder is opaque, conventional "transmission-type" probes are not suitable. Instead, a diffuse-reflectance-type probe, which does not rely on passing a light beam through the material being analyzed, is employed. The probe 4 passes through the barrel 6 of the dewatering extruder (1), preferably, but not limited to, a region proximal the exit. Because probe 4 operates within the environment of the dewatering extruder (1), the probe must be designed to withstand elevated temperatures and pressures. One type of suitable probe includes a hollow probe with internal optics, provided with a small (e.g., 0.5 inch) sapphire window through which the NIR signal is transmitted and returned. A preferred probe, less susceptible to internal water leakage, includes a plurality of terminated fiber optic cables in which light is returned to the analyzer by a single fiber optic cable and the remainder of the fiber optic cables are used to transmit light from the IR light source of the analyzer.

The plurality of fiber optic cables are bundled and enclosed or "potted" within a stainless steel sheath. A suitable probe is available on specification from Visionex (Warner Robins, Ga.).

The probe is preferably inserted through the sidewall, into the interior of barrel 6 as close as possible to exit die 7. The probe can be held in place by conventional means (e.g., a Swagelock® fitting). The probe can be placed anywhere downstream of the barrel drainage slots and upstream of the exit die. Placing the probe close to the exit die insures that that the measured mill moisture is representative of mill moisture of the crumb exiting the dewatering extruder.

Placement of the probe proximal the exit of the die of the extruder is intended to give those or ordinary skill guidance for optimum determination and control of water in the elastomeric polymer. In a dewatering extruder, where gross amounts of water are removed, from slurrys containing on the order of 50% (wt) water, the probe placement will be in the half of the extruder barrel closest to the die, preferably the last one third, more preferably the last quarter, most preferably the last 15% of the barrel length (e.g., closest to the die).

The dewatering extruders will generally lower the water content of the elastomer/water mixture to the 3–30% range, preferably 3–25%, more preferably 5–20% range. While drying may be accomplished in a broad number of ways, including but not limited to drying extruders, drying sections of combination dewatering and drying extruders, tunnel dryers, combinations thereof, and the like, a series scheme is described here.

In the series scheme, a drying extruder can follow the dewatering extruder and the moisture or water content is lowered still further. The drying extruder will lower the moisture content to the range of 0–5% (wt), preferably 0–3.5%, more preferably 0–2.5%, most preferably 0–2%. Placement of a probe in such a drying extruder will differ somewhat from placement in the dewatering extruder. In the drying extruder the optimum placement will be at any point along the length of the barrel where pressure begins to build above atmospheric in the extrudate, that is where the extrudate begins to be compressed. Prior to such pressure development, meaningful determination of moisture content is generally not achievable.

Moisture content analysis can be performed at any desired interval, and one analyzer can be attached to a number of probes by multiplexing. However, only one analysis can be performed at any given time by a single analyzer. Therefore, with an analysis time of 70 seconds (as an example), the use of one analyzer would provide a cycle time of one reading per expeller of less than five minutes, which is generally sufficient for purposes of extruder control applications.

The moisture content data provided by FTNIR analysis can then be used in a microprocessor based closed-loop feedback system 8, to control the moisture content of the rubber crumb exiting the dewatering extruder. The microprocessor can be programmed to maintain moisture content of the crumb at a predetermined level, which can then be compared to the actual moisture content provided by FTNIR spectrometer analyzer 2. To affect the control of moisture content, the control system can be operated to vary parameters such as extruder temperature, slurry feed rate, the initial water content of the slurry, aperture size of the exit die or other parameters that would be apparent to one of ordinary skill in the art.

While a preferred embodiment in accordance with the invention has been shown and described, it is to be clearly understood that the same are susceptible to numerous changes apparent to one of ordinary skill in the art. Therefore, the invention should not be deemed to be limited to the details shown and described above, and should be considered to include all changes and modifications that come within the scope of the appended claims.

What is claimed is:

1. An extruder for removing water from a slurry of an elastomeric polymer and water, said extruder comprising an elongated barrel having a first end and a second end, said first end capable of receiving said slurry, drainage slots located between said first end and said second end for removing water from said slurry, a die located proximal to said second end, a diffuse reflectance probe positioned at least partially within said barrel and located downstream of said drainage slots and upstream of said die, said probe connected to a device capable of determining water content of said slurry within said barrel, and a control system for controlling the water content of said elastomeric polymer exiting said extruder through said die based, at least in part, on said water content.

2. The extruder of claim 1, wherein said device comprises a Fourier Transform Near Infrared (FTNIR) spectrometer.

3. The extruder of claim 1, wherein said control system comprises a closed loop feedback system.

4. The extruder of claim 3, wherein said control system controls the water content of said elastomeric polymer exiting said extruder by varying at least one operating parameter selected from the group consisting of extruder temperature, slurry feed rate, initial slurry water content, exit die aperture size, and combinations thereof.

5. The extruder of claim 1 wherein said probe comprises a plurality of terminated fiber optic cables.

* * * * *